US010511928B2

(12) United States Patent
Brettle (10) Patent No.: US 10,511,928 B2
(45) Date of Patent: Dec. 17, 2019

(54) SPATIAL AUDIO TRIGGERED BY A USERS PHYSICAL ENVIRONMENT (71) Applicant: Google Inc., Mountain View, CA (US)

(72) Inventor: Jamieson Brettle, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 104 days.

(21) Appl. No.: 15/670,131

(22) Filed: Aug. 7, 2017

(65) Prior Publication Data

US 2019/0045318 A1 Feb. 7, 2019

(51) Int. Cl.
H04S 7/00 (2006.01)
H04R 5/02 (2006.01)
H04W 4/02 (2018.01)
G06F 16/68 (2019.01)
G06F 16/487 (2019.01)
G06F 3/16 (2006.01)
G06F 16/64 (2019.01)
(Continued)

(52) U.S. Cl.
CPC .............. H04S 7/303 (2013.01); G06F 3/167 (2013.01); G06F 16/487 (2019.01); G06F 16/64 (2019.01); G06F 16/68 (2019.01); H04R 5/02 (2013.01); H04W 4/02 (2013.01); G06Q 30/0251 (2013.01); G09B 5/04 (2013.01); H04S 2400/11 (2013.01)

(58) Field of Classification Search
CPC ...... H04S 7/303; H04S 2400/11; G06F 3/167; G06F 16/64; G06F 16/68; G06F 16/487; H04W 4/02; H04R 5/02; G09B 5/04; G06Q 30/0251

USPC ......................................................... 701/431
See application file for complete search history.

(56) References Cited

U.S. PATENT DOCUMENTS 7,739,712 B2 * 6/2010 Boyden ................ H04B 1/7163
725/138
9,686,466 B1 * 6/2017 Billinghurst ....... H04N 5/23238
(Continued)

FOREIGN PATENT DOCUMENTS

EP 2824649 A1 1/2015

OTHER PUBLICATIONS

International Search Report and Written Opinion for International Application No. PCT/US2018/037336, dated Sep. 20, 2018, 12 pages.

Primary Examiner — Muhammad Shafi
(74) Attorney, Agent, or Firm — Brake Hughes Bellerman LLP (57) ABSTRACT Techniques of providing spatial audio to a remote user involve transmitting audio data in response to sensor information sent from the remote user. Along these lines, a user remote from a server computer may have a device that is configured to provide data from a sensor, e.g., a GPS, an accelerometer, an orientation sensor, a heart rate monitor, and the like. For example, the user may have granted access to such data via a specialized website hosted by the server computer. The sensor may then send, via a user device (e.g., a smartphone), sensor information that indicates the value of the state of the user. Based on the value of the state of the user, the server computer may then produce an audio file that includes audio data. The server computer may then transmit that audio data to the user device so that the user may hear the audio data.

20 Claims, 5 Drawing Sheets (51) Int. Cl.
 *G06Q 30/02* (2012.01)
 *G09B 5/04* (2006.01)

(56) References Cited

U.S. PATENT DOCUMENTS

| | | | |
|---|---|---|---|
| 2007/0022449 A1* | 1/2007 | Boyden | H04B 1/7163 |
| | | | 725/81 |
| 2015/0260532 A1* | 9/2015 | Sanio | G01C 21/32 |
| | | | 701/533 |
| 2016/0240100 A1 | 8/2016 | Rauhala et al. | |
| 2018/0332423 A1* | 11/2018 | Edry | H04S 7/303 |

\* cited by examiner

FIG. 1

| State | Min Value | Max Value | Audio File |
|---|---|---|---|
| POSITION | 0 | 10 | BeautyStore.amb |
| AND_POLAR_ANGLE | 20 | 25 | DoctorOffice.amb |
| AND_AZIMUTH_ANGLE | 70 | 90 | Restaurant.amb |
| HEART_RATE | 140 | - | Electrolytes.amb |
| SPEED | 3.5 | - | |
| AND_DIRECTION_X | - | -2 | |
| AND_DIRECTION_Y | 1 | 3 | Caution.amb |

SPATIAL AUDIO TRIGGERED BY A USERS PHYSICAL ENVIRONMENT

TECHNICAL FIELD

This description relates to providing audio to a user based on the user's physical environment for, e.g., an audio tour or a game.

BACKGROUND

Audio tours provide users with individual, more detailed experiences of their surroundings. Some audio tours include a playing device that plays specific audio to a user and headphones that output the audio to that user only. For example, when used on a walking or riding tour of a city street, an audio tour may include various segments corresponding to specific items of interest on and around the street. In conventional audio tours, each of the various segments may be triggered by an active user action, i.e., a button press signifying that the user is at a place corresponding to a segment. The playing device may retrieve the audio locally or over a radio antenna or via a remote server.

SUMMARY

In one general aspect, a method can include receiving, by controlling circuitry of a server computer configured to provide audio to a remote user, sensor information generated by a sensor connected to the remote user, the sensor information indicating a value of a state of the remote user. The method can also include, in response to receiving the sensor information, performing, by the controlling circuitry, a retrieval operation on a table in a memory of the server computer to produce audio data, the table providing a map between values of states of the user and locations in the memory at which a corresponding audio file that includes the audio data is stored. The method can further include transmitting, by the controlling circuitry, the audio data to the remote user, the audio data providing audio to the remote user.

The details of one or more implementations are set forth in the accompanying drawings and the description below. Other features will be apparent from the description and drawings, and from the claims.

DETAILED DESCRIPTION

In a conventional audio tour, there is no opportunity for the user to passively send information such as spatial location back to a remote server. Accordingly, it is difficult for such an audio tour to adapt to changes in the surroundings and point out new information.

In accordance with the implementations described herein and in contrast with the above-described conventional audio tours, improved techniques of providing spatial audio to a remote user involve transmitting audio data in response to sensor information sent from the remote user. Along these lines, a user remote from a server computer may have a device that is configured to provide data from a sensor, e.g., a GPS, an accelerometer, an orientation sensor, a heart rate monitor, and the like including a value of a state of the user. For example, the user may have granted access to such data via a specialized website hosted by the server computer. The sensor may then send, via a user device (e.g., a smartphone), sensor information that indicates the value of the state of the user. Based on the value of the state of the user, the server computer may then produce (e.g., select or generate) an audio file that includes audio data. The server computer may then transmit that audio data to the user device so that the user may hear the audio data.

Advantageously, by sending such audio in response to specific sensor data, i.e., defining "audio-only augmented reality," a user may be provided with real-time information during an audio tour. Further, such audio-only augmented reality may be used in gaming to enhance a player's experience and in complex task support to provide clarifying operating instructions on demand. For example, if a user looks in the direction of an object (e.g., an advertisement), the server computer may send audio to the user providing more details about that object.

Figure 1:
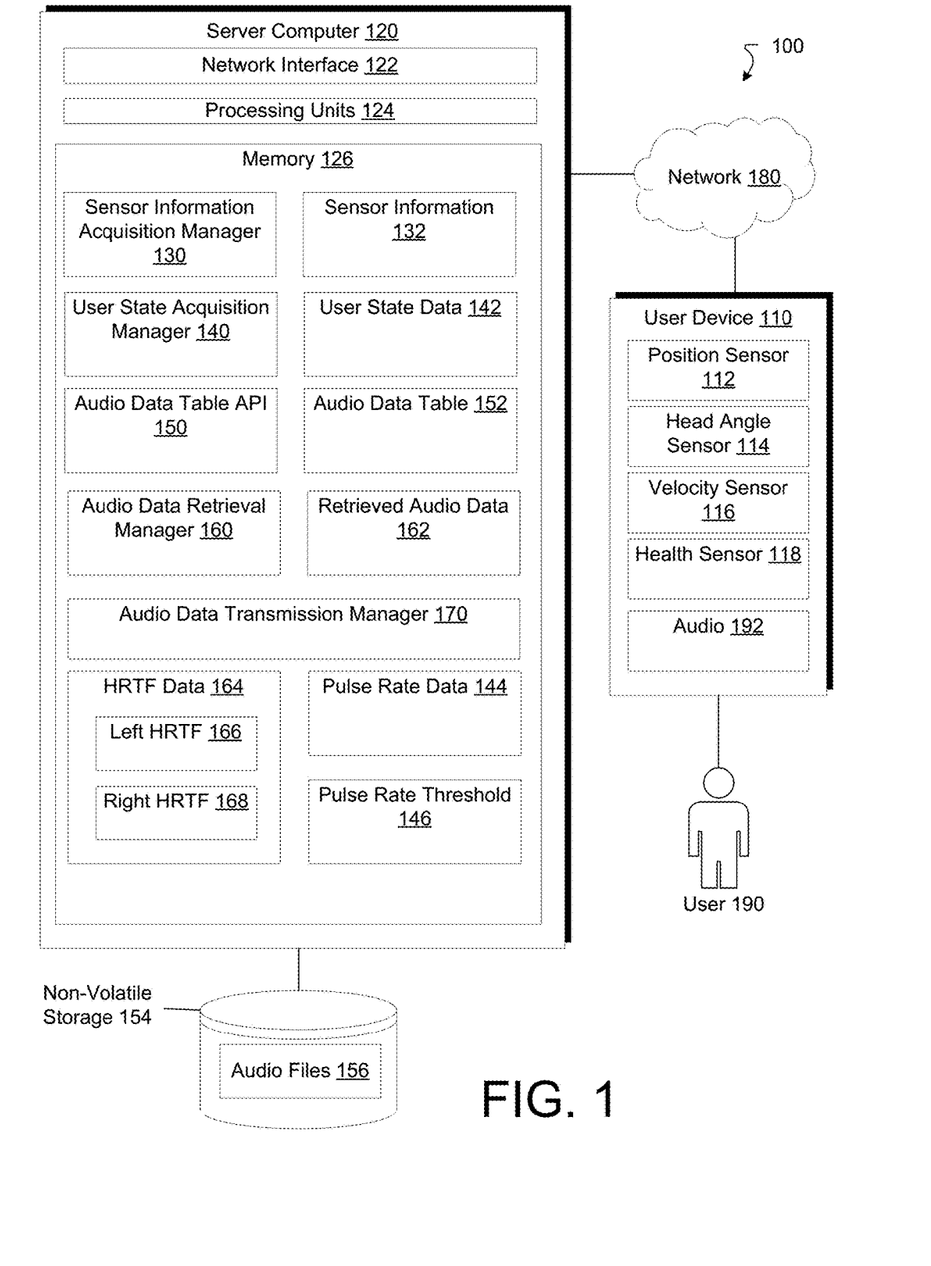
FIG. 1 is a diagram that illustrates an example electronic environment for implementing improved techniques described herein.

FIG. 1 is a diagram that illustrates an example electronic environment 100 in which the above-described improved techniques may be implemented. As shown, in FIG. 1, the example electronic environment 100 includes a user device 110, a server computer 120, and a network.

The user device 110 is configured to transmit data from one of several sensors (e.g., position sensor 112, head angle sensor 114, velocity sensor 116, and health sensor 118) to the server computer 120. For example, the user device 110 may be a smartphone, a smart watch, a tablet computer, or the like. In some implementations, the various sensors is located outside of the user device 110 on devices separate from the user device, e.g., connected to the user 190.

The position sensor 112 is configured to determine the position of the user device 110 within a global coordinate system. In some implementations, the position sensor 112 includes a global positioning system (GPS) system.

The head angle sensor 114 is configured to determine the orientation of the head of the user 190. In some implementations, the head angle sensor 114 includes an accelerometer and a gyroscope. In some implementations, the head angle sensor 114 also includes a magnetometer. In some implementations, the orientation of the head s expressed in terms of pitch, roll, and yaw. In some implementations, the orientation of the head is expressed in terms of polar and azimuthal angles.

The velocity sensor 116 is configured to determine a speed and/or direction of motion of the user 190. In some implementations, the velocity sensor 116 includes an accelerometer.

The health sensor 118 is configured to determine a value of a health state of the user 190. In some implementations, the health sensor 118 includes a heart rate monitor, and the health state includes a pulse rate. In some implementations, the health sensor 118 includes any of the following: blood pressure, blood oxygen, blood glucose, blood alcohol, body temperature, and respiratory rate.

In some implementations, the user device 110 is configured to encode values of states of the user 190 within a signal that the user device 110 is configured to transmit to the server computer 120 over the network 180. In some implementations, the user device 110 uses a linear coding technique such as a Reed-Solomon code to encode the state values within the signal.

The user device 110 is also configured to receive audio 192 from the server computer 120 and play the audio 192 to the user 190 associated with the user device 110. In some implementations, the audio 192 is in stereo format. In some implementations, the audio 192 is in B-format ambisonic format. In some implementations, the audio 192 is in higher-order ambisonic format.

The server computer 120 is configured to render sound fields for a listener. The server computer 120 includes a network interface 122, one or more processing units 124, and memory 126. The network interface 122 includes, for example, Ethernet adaptors, Token Ring adaptors, and the like, for converting electronic and/or optical signals received from the network 180 to electronic form for use by the server computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the server computer 120 can be, or can include processors (e.g., processing units 124) configured to process instructions stored in the memory 126. Examples of such instructions as depicted in FIG. 1 include a sensor information acquisition manager 130, a user state acquisition manager 140, an audio data application programming interface (API) 150, an audio data retrieval manager 160, and an audio data transmission manager 170. Further, as illustrated in FIG. 1, the memory 126 is configured to store various data, which is described with respect to the respective managers that use such data.

The sensor information acquisition manager 130 is configured to acquire sensor information 132 via the network interface 122 over the network 180. In some implementations, the sensor information acquisition manager 130 is configured to receive, as the sensor information 132, a signal including encoded values of the state of the user 142.

The user state acquisition manager 140 is configured to acquire values of the state of the user 142 from the sensor information 132. In some implementations, the user state acquisition manager 140 is configured to perform a decoding operation to produce the values of the state of the user 142. The values of the state of the user 142 includes values of any of the various states of the user 190 such as position, head orientation, velocity, and health collected by the respective sensors 112, 114, 116, and 118 of the user device 110 shown in FIG. 1.

The audio data table application programming interface (API) 150 is configured to provide a website developer with the tools needed to construct an audio data table 152 that maps a state of the user 190 to an audio file 156. In some implementations, the API 150 includes a graphical user interface (GUI) that provides the developer with the capability to upload audio files 156 (e.g., files including audio 192) to non-volatile storage 154 associated with the server computer 120. In some implementations, the API 150 provides the developer with the capability to associate states of the user 142 with the audio files 156.

In some implementations, a developer of an application may use the API 150 to identify an application server that runs that application through which the audio data may be sent to the remote user. In this way, the API provides a service to other applications rather than taking the form of an application itself. Such a service is seamless to the user, aside from the user granting permission to the server computer 120 to access sensor information.

Figure 2:
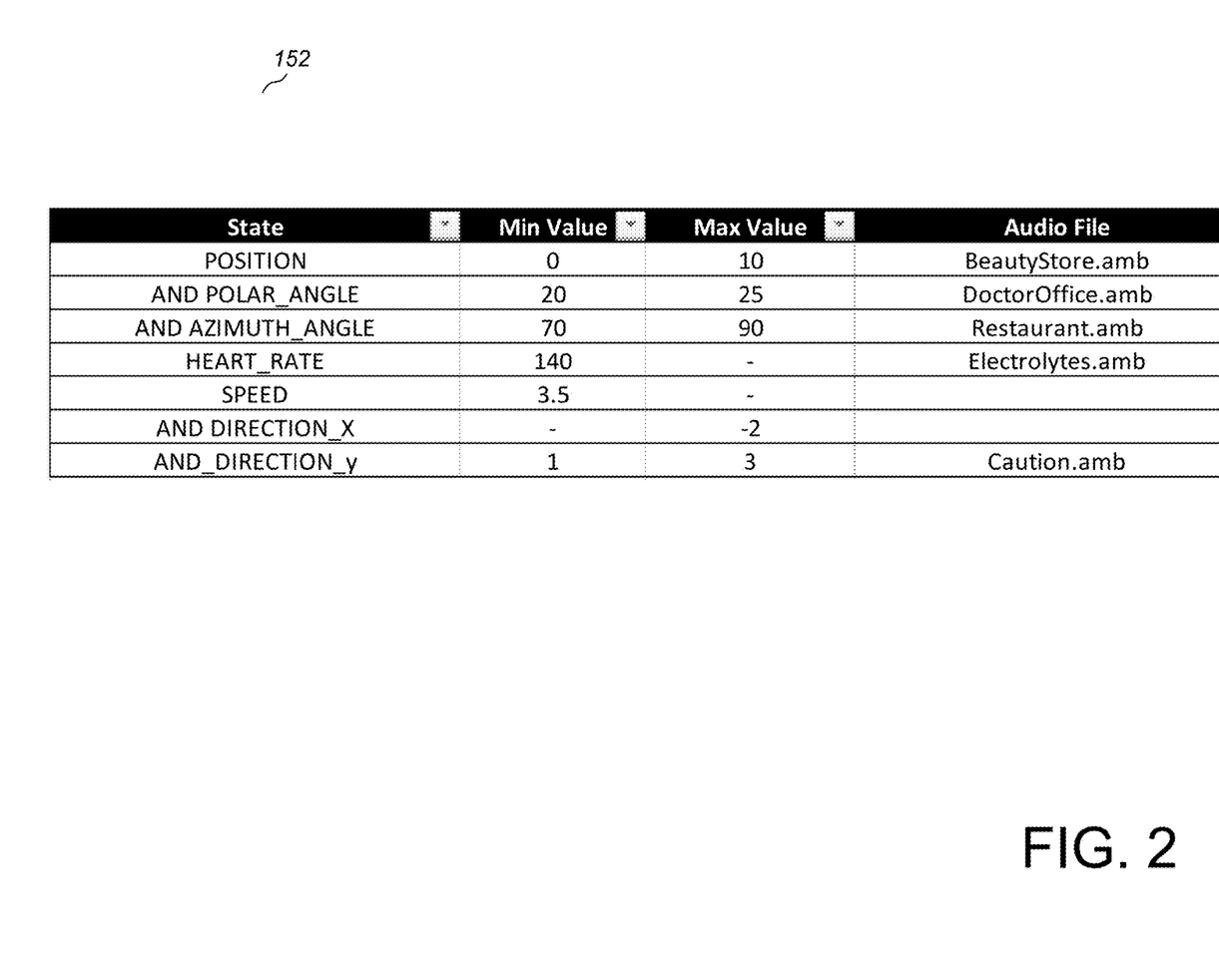
FIG. 2 is a diagram that illustrates an example audio data table according to the improved techniques performed within the electronic environment shown in FIG. 1.

FIG. 2 is a diagram that illustrates an example of such an audio data table 152. In this example, the table 152, there are four columns: a state identifier, a minimum value of the state, a maximum value of the state, and an audio filename. The state identifier identifies a state such as position ("POSITION"), orientation ("POLAR_ANGLE," "AZIMUTH_ANGLE"), velocity ("SPEED," "DIRECTION_X," "DIRECTION_Y"), and health ("HEART_RATE"). The minimum and maximum value of each state represent a range of values of that state for which a particular audio file is to be sent. The audio filename refers to the audio file that is to be sent to the user device 110 in response to a state having values within the range shown in the table.

There are also logical conditions for which a combination of states may trigger a particular audio file. For example, the first three entries of the table 152 in FIG. 2 show a combination of position and head orientation that triggers the transmission of an audio file different than that triggered from the position alone. The particular case shown in FIG. 2 may refer to a response when a user looks on the second floor of a building rather than the first floor or straight ahead.

The filenames shown in FIG. 2 have extension ".amb," which indicates that the audio files listed are in an ambisonic format, e.g., B-format or other higher-order ambisonic format. Such an audio format provides the user device with the capability of playing directional audio to the user 190, i.e., audio that the user 190 perceives as coming from a particular direction. Such an audio format is advantageous in providing visual context to the user 190 for the audio the user 190 hears. Such directionality provides the user 190 with an audio-only augmented reality environment in which the user 190 may automatically hear audio in response to looking at objects in a particular direction. Further detail about such an environment is provided with regard to FIG. 4.

Returning to FIG. 1, the audio data retrieval manager 160 is configured to perform logical operations as described above to determine the audio file 162 to be retrieved in response to the value of the state of the user 190 taking on a particular value. In some implementations, such an operation is equivalent to a relational database lookup operation such as SQL. In some implementations, such an operation is equivalent to a non-relational, NoSQL database lookup operation.

The audio data transmission manager 170 is configured to transmit the retrieved audio to the user device 110 via the network interface 122 over the network 180.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the server computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the server computer 120.

The components (e.g., managers, processing units 124) of the server computer 120 can be configured to operate based on one or more platforms (e.g., one or more similar or different platforms) that can include one or more types of hardware, software, firmware, operating systems, runtime libraries, and/or so forth.

The components of the server computer 120 can be, or can include, any type of hardware and/or software configured to process attributes. In some implementations, one or more portions of the components shown in the components of the server computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the server computer 120 can be, or can include, a software module configured for execution by at least one processor (not shown). In some implementations, the functionality of the components can be included in different modules and/or different components than those shown in FIG. 1.

In some implementations, the components of the server computer 120 (or portions thereof) can be configured to operate within a network. Thus, the components of the server computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the server computer 120 can be, or can include, processors configured to process instructions stored in a memory. For example, the sensor information acquisition manager 130 (and/or a portion thereof), the user state acquisition manager 140 (and/or a portion thereof), the audio data table API 150 (and/or a portion thereof), the audio data retrieval manager 160 (and/or a portion thereof), and the audio data transmission manager (and/or a portion thereof can include a combination of a memory storing instructions related to a process to implement one or more functions and a configured to execute the instructions.

The network 180 is configured and arranged to provide network connections between the VR controller 110 and the server computer 120. The network 180 may implement any of a variety of protocols and topologies that are in common use for communication over the Internet or other networks. Further, the network 180 may include various components (e.g., cables, switches/routers, gateways/bridges, etc.) that are used in such communications.

Figure 3:
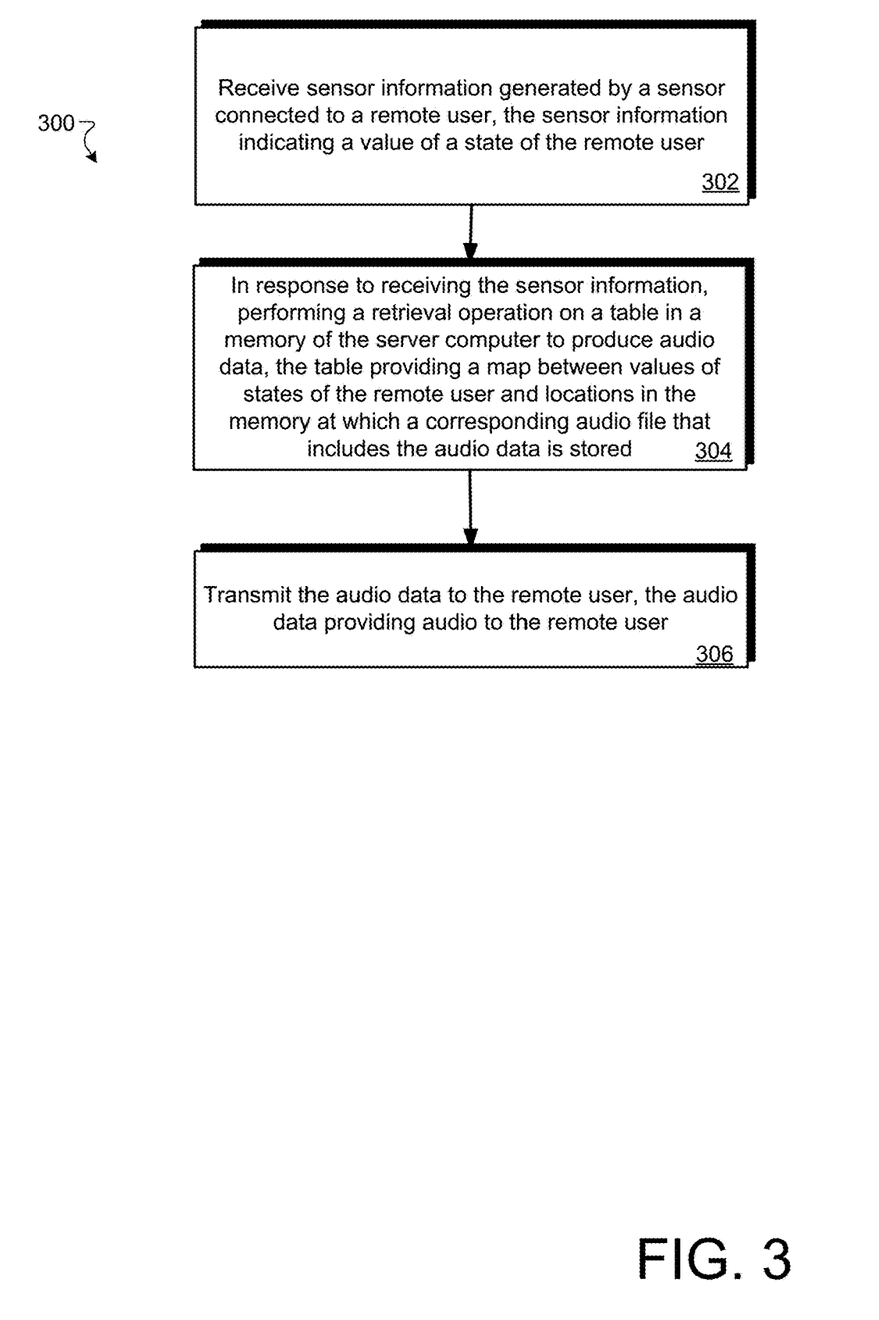
FIG. 3 is a flow chart that illustrates an example method of performing the improved techniques within the electronic environment shown in FIG. 1.

FIG. 3 is a flow chart that illustrates an example method 300 of providing spatial audio to a remote user. The method 300 may be performed by software constructs described in connection with FIG. 1, which reside in memory 126 of the server computer 120 and are run by the set of processing units 124.

At 302, controlling circuitry of the server computer 120 receives sensor information generated by a sensor connected to a remote user. The sensor information indicates a value of a state of the remote user. For example, when a sensor connected to the user transmits encoded values of a state of the user (e.g., position, head orientation, etc.) to the server computer 120, the server computer 120 decodes those values and stores them in memory.

At 304, the controlling circuitry performs a retrieval operation on a table in a memory of the server computer to produce audio data. The table provides a map between the values of states of the remote user and locations in the memory at which a corresponding audio file that includes the audio data is stored. For example, the server computer 120 may use an audio data table such as that shown in FIG. 2 to select a file stored in non-volatile storage. In some implementations, the server computer 120 may instead generate an audio file based on the value of the state of the user.

At 306, the controlling circuitry transmits the audio data to the remote user device, the audio data providing audio to the remote user. The user may then hear the audio as played by the user device 110. The audio may be stored locally on the user device or streamed.

Figure 4:
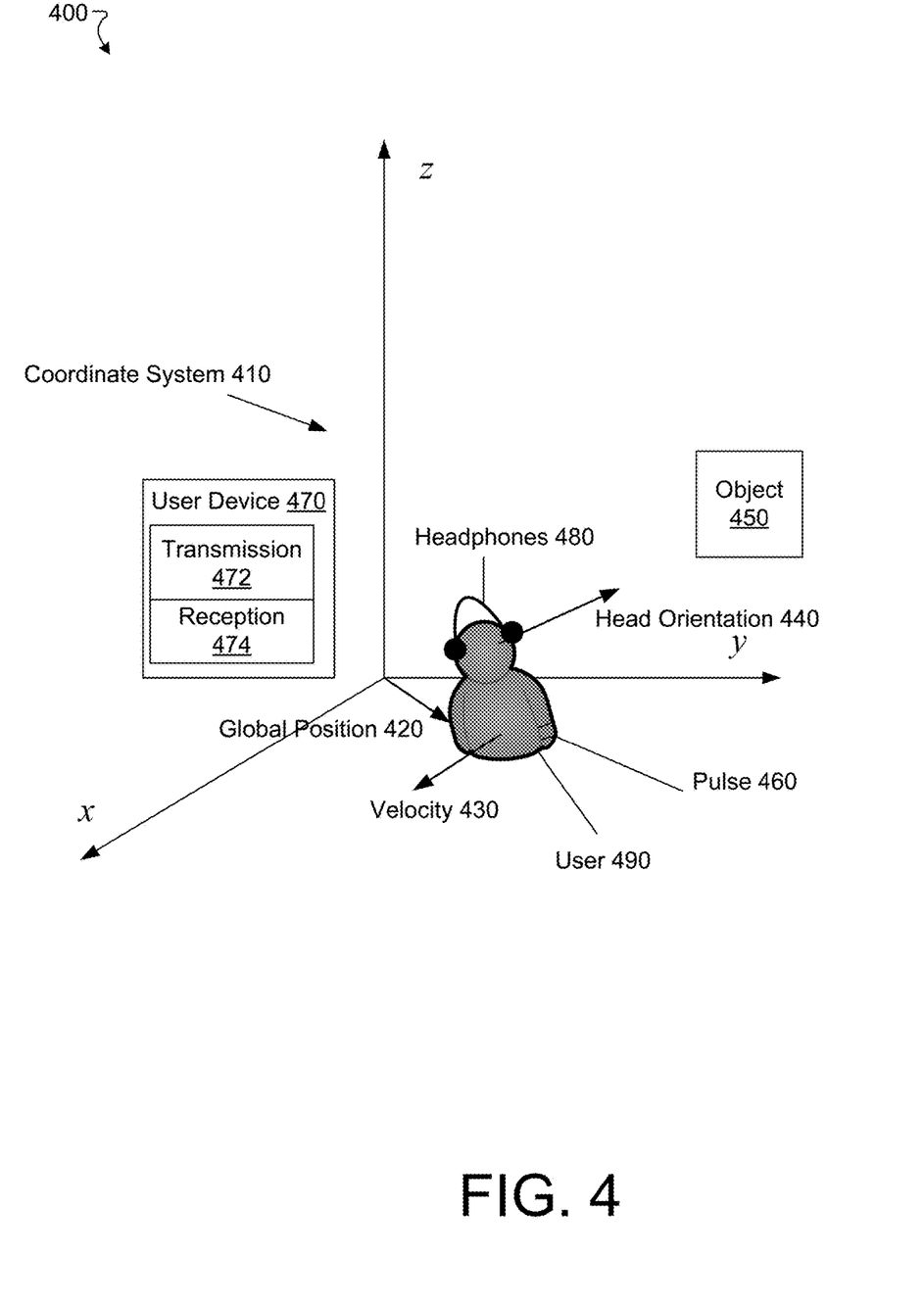
FIG. 4 is a diagram that illustrates an example physical environment in which a user transmits sensor information and receives audio.

FIG. 4 illustrates an example physical environment 400 in which a user transmits sensor information to the server computer 120 and receives audio based on the transmitted sensor information. In the physical environment 400, the user 490 wears headphones 480 which provide the audio to ears of the user 490. The user 490 also has a user device 470 that includes a transmission module 472 and a reception module 474. The transmission module 472 sends sensor information to the server computer 120 and the reception module 474 receives respective audio data in response.

In the physical environment 400, the user 490 has various sensors that record the various states of the user 490. In one example, the user 490 is at a global position 430 with respect to an origin, e.g., from a GPS sensor. In another example, the user 490 has a head orientation 440 in order to look at an object 450 (e.g., a building, a sign, a billboard advertisement, etc.). In another example, the user 490 moves with a velocity 430. In another example, the user 490 produces a pulse 460 at some rate.

The user device 470, prior to transmission of the sensor information, may encode the values of the state of the user 490 to produce the sensor information. The transmission module 472 of the user device 470 may then transmit the sensor information to the server computer 120. In some arrangements, the server computer 120 may send audio data in response to a state of the user 490 having a value in a given range. For example, the server computer 120 may send particular audio (e.g., advertising a sports drink) in response to the pulse rate of the user 490 being greater than a threshold.

When the reception module 474 of the user device 470 receives the audio data sent by the server computer 120, the user device 470 renders the audio data according to its format. For example, when the audio format is ambisonic, then the user device 470 renders the audio data using left and right head-related transfer functions (HRTFs) for play in the headphones 480.

Figure 5:
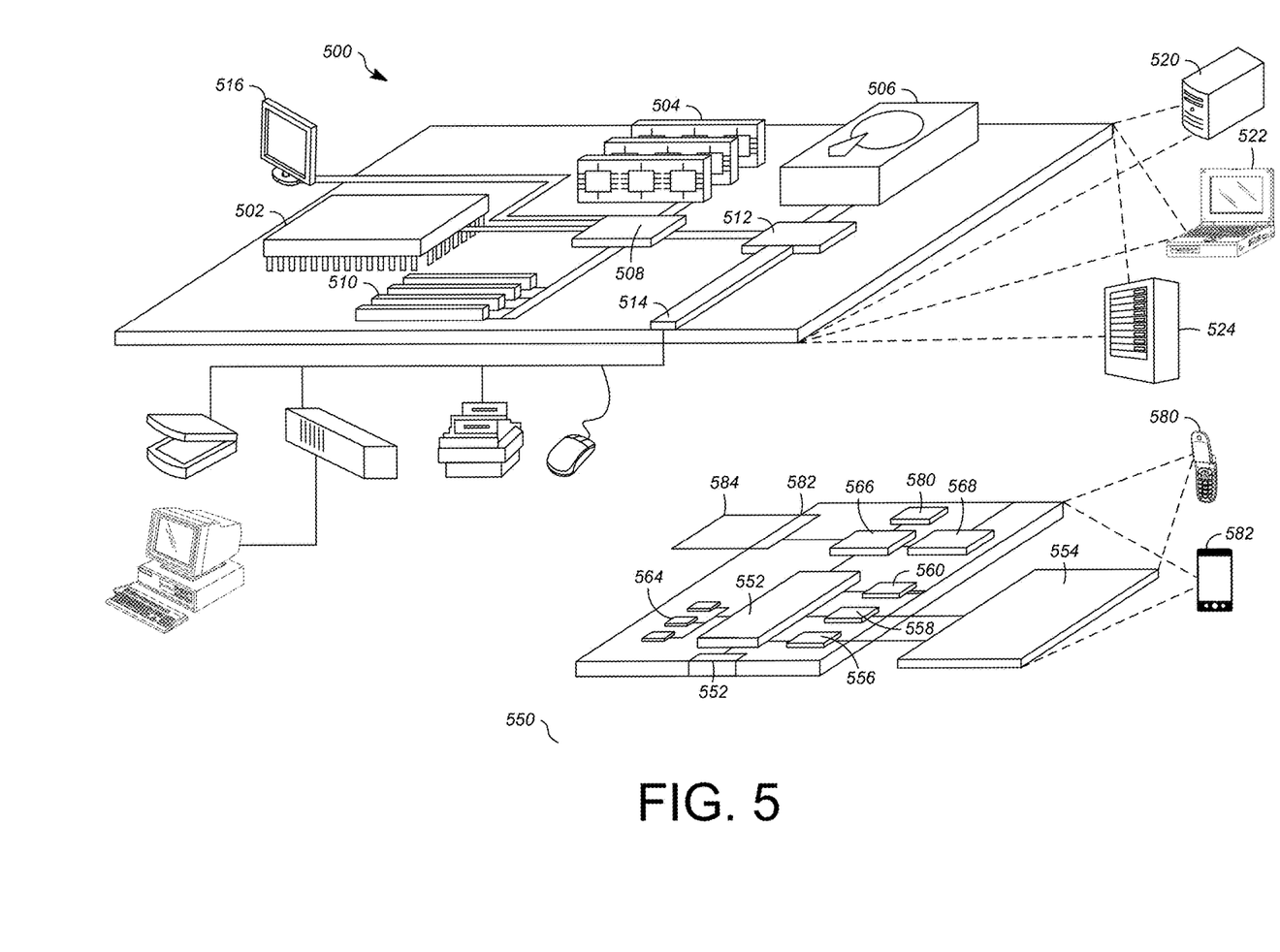
FIG. 5 illustrates an example of a computer device and a mobile computer device that can be used with circuits described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 450, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or subcombinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
receiving, by controlling circuitry of a server computer configured to provide audio to a remote user, sensor information generated by a sensor connected to the remote user, the sensor information indicating a value of a state of the remote user;
in response to receiving the sensor information, performing, by the controlling circuitry, a retrieval operation on a table in a memory of the server computer to produce audio data, the table providing a map between values of states of the remote user and locations in the memory at which a corresponding audio file that includes the audio data is stored; and
transmitting, by the controlling circuitry, the audio data to the remote user, the audio data providing audio to the remote user.

2. The method as in claim 1, wherein the server computer is a web server configured to host a website through which the user device provides the sensor information to the server computer, and
wherein the method further comprises:
prior to receiving the sensor information, receiving initialization data indicating that the remote user has granted the server computer access to the sensor information.

3. The method as in claim 1, wherein receiving the sensor information includes:
obtaining the sensor information from an application server hosting an application running on a user device of the remote user, and
wherein transmitting the audio data to the user includes sending the audio data to the application server for transmission to the remote user.

4. The method as in claim 1, wherein an entry of the table includes a minimum value of the state of the user and a maximum value of the state of the user; and
wherein performing the retrieval operation on the table includes:
comparing the value of the state of the user with the minimum value and the maximum value.

5. The method as in claim 1, wherein receiving the sensor information includes obtaining, as the value of the state of the user, a rotation angle of a head of the user.

6. The method as in claim 5, wherein the audio data is in a high-order ambisonic (HOA) format, and
wherein producing the audio data in response to receiving the sensor information includes:
generating a pair of head-related transfer functions (HRTFs) based on the rotation angle of the head of the user.

7. The method as in claim 1, wherein receiving the sensor information includes obtaining, as the value of the state of the user, a velocity of the user within a global coordinate system.

8. The method as in claim 1, wherein receiving the sensor information includes obtaining, as the value of the state of the user, values of health parameters indicating a state of health of the user.

9. The method as in claim 8, wherein obtaining the values of the health parameters includes acquiring a pulse rate of the user.

10. The method as in claim 9, wherein performing the retrieval operation on the table includes:
selecting an audio file that includes the audio data in response to the pulse rate being greater than a threshold; and
not selecting the audio file in response to the pulse rate being less than the threshold.

11. A computer program product comprising a nontransitive storage medium, the computer program product including code that, when executed by processing circuitry of a server computer configured to provide audio to a remote user, causes the processing circuitry to perform a method, the method comprising:
receiving sensor information generated by a sensor connected to the remote user, the sensor information indicating a value of a state of the remote user;
in response to receiving the sensor information, performing a retrieval operation on a table in a memory of the server computer to produce audio data, the table providing a map between values of states of the remote user and locations in the memory at which a corresponding audio file that includes the audio data is stored; and
transmitting the audio data to the remote user, the audio data providing audio to the remote user.

12. The computer program product as in claim 11, wherein the server computer is a web server configured to host a website through which the user device provides the sensor information to the server computer, and
wherein the method further comprises:
prior to receiving the sensor information, receiving initialization data indicating that the remote user has granted the server computer access to the sensor information generated by the user device.

13. The computer program product as in claim 11, wherein receiving the sensor information includes:
obtaining the sensor information from an application server hosting an application running on a user device of the remote user, and
wherein transmitting the audio data to the user includes sending the audio data to the application server for transmission to the remote user.

14. The computer program product as in claim 11, wherein an entry of the table includes a minimum value of the state of the user and a maximum value of the state of the user; and
wherein performing the retrieval operation on the table includes:
comparing the value of the state of the user with the minimum value and the maximum value.

15. The computer program product as in claim 11, wherein receiving the sensor information includes obtaining, as the value of the state of the user, a rotation angle of a head of the user.

16. The computer program product as in claim 15, wherein the audio data is in a high-order ambisonic (HOA) format, and
wherein producing the audio data in response to receiving the sensor information includes:

generating a pair of head-related transfer functions (HRTFs) based on the rotation angle of the head of the user.

17. The computer program product as in claim 11, wherein receiving the sensor information includes obtaining, as the value of the state of the user, a velocity of the user within a global coordinate system.

18. The computer program product as in claim 11, wherein receiving the sensor information includes obtaining, as the value of the state of the user, values of health parameters indicating a state of health of the user.

19. The computer program product as in claim 18, wherein obtaining the values of the health parameters includes acquiring a pulse rate of the user.

20. An electronic apparatus configured to provide audio to a remote user, the electronic apparatus comprising:
  memory; and
  controlling circuitry coupled to the memory, the controlling circuitry being configured to:
    receive sensor information generated by a sensor connected to the remote user, the sensor information indicating a value of a state of the remote user;
    in response to receiving the sensor information, perform a retrieval operation on a table in a memory of the server computer to produce audio data, the table providing a map between values of states of the remote user and locations in the memory at which a corresponding audio file that includes the audio data is stored; and
    transmitting the audio data to the remote user, the audio data providing audio to the remote user.

* * * * *